United States Patent [19]

Szabat et al.

[11] Patent Number: 5,693,686
[45] Date of Patent: Dec. 2, 1997

[54] FOAM-FORMING MIXTURES WITH DECREASED DECOMPOSITION OF HYDROHALOCARBON BLOWING AGENTS

[75] Inventors: John F. Szabat, Pittsburgh; Charles E. Mortimer, Tarentum; Joseph M. Sutej, New Brighton; Jeanne L. Beaumont, Oakdale, all of Pa.; Steven L. Schilling, Glen Dale, W. Va.; Harold R. Parsons, Wheeling, W. Va.; Robert P. Yeater, Moundsville, W. Va.

[73] Assignee: Bayer Corporation, Pittsburgh, Pa.

[21] Appl. No.: 194,433

[22] Filed: Feb. 10, 1994

[51] Int. Cl.$^6$ .................... C08J 9/08; C08J 9/14; C08G 18/70; C08G 18/72

[52] U.S. Cl. .................. 521/131; 521/107; 521/113; 521/130; 521/164; 521/170; 521/174; 521/175; 521/902; 252/182.2; 252/182.24; 252/182.26; 252/182.27; 252/182.28; 560/330; 560/331; 560/354; 560/355; 560/358; 560/360

[58] Field of Search ....................... 521/107, 113, 521/130, 131, 902, 175, 170, 174, 164; 560/330, 331, 354, 355, 358, 360; 252/182.1, 182.24, 182.26, 182.27, 182.28

[56] References Cited

U.S. PATENT DOCUMENTS

| | | | |
|---|---|---|---|
| 3,899,443 | 8/1975 | Reymore, Jr. et al. | 521/171 |
| 4,011,180 | 3/1977 | Lockwood et al. | 521/174 |
| 4,332,716 | 6/1982 | Shah | 521/137 |
| 4,418,158 | 11/1983 | Frentzel | 521/160 |
| 4,555,418 | 11/1985 | Snider et al. | 521/167 |
| 4,729,850 | 3/1988 | Frentzel | 252/356 |
| 4,904,704 | 2/1990 | Nafziger et al. | 521/156 |
| 5,106,527 | 4/1992 | Doerge et al. | 252/172 |
| 5,109,031 | 4/1992 | Snider | 521/172 |
| 5,124,366 | 6/1992 | Gluck et al. | 521/128 |
| 5,137,929 | 8/1992 | Demmin et al. | 521/99 |
| 5,189,074 | 2/1993 | Moore, Jr. | 521/114 |
| 5,308,881 | 5/1994 | Londrigan et al. | 521/112 |
| 5,308,883 | 5/1994 | Londrigan et al. | 521/125 |
| 5,312,848 | 5/1994 | Klapper et al. | 521/902 |
| 5,362,764 | 11/1994 | Londrigan et al. | 521/112 |
| 5,395,859 | 3/1995 | Demmin et al. | 521/170 |
| 5,405,884 | 4/1995 | Londrigan et al. | 521/128 |
| 5,561,171 | 10/1996 | Demmin et al. | 521/170 |

*Primary Examiner*—Rabon Sergent
*Attorney, Agent, or Firm*—Joseph C. Gil; Lyndanne M. Whalen

[57] ABSTRACT

A polyisocyanate having an acid value of at least 0.01% HCl is used to produce polyisocyanate, polyisocyanurate and polyurethane urea foams with an HCFC blowing agent. The use of such a polyisocyanate is advantageous because the polyisocyanate does not cause significant decomposition of the HCFC blowing agent.

29 Claims, No Drawings

FOAM-FORMING MIXTURES WITH DECREASED DECOMPOSITION OF HYDROHALOCARBON BLOWING AGENTS

BACKGROUND OF THE INVENTION

The present invention relates to foam-forming mixtures in which the dehydrohalogenation of a hydrohalocarbon blowing agent is substantially avoided, a process for the production of foams from such mixtures and to the rigid foams produced from these mixtures.

It is known that rigid, low density polyurethane and polyisocyanurate foams may be produced by reacting and foaming a mixture which includes an organic diisocyanate or polyisocyanate with an isocyanate reactive mixture in the presence of a volatile blowing agent which vaporizes at temperatures generated during the reaction.

In the commercial production of rigid polyurethane and polyisocyanurate foams, chlorofluorocarbons such as trichlorofluoromethane have been used as the blowing agent. However, these chlorofluorocarbons are believed to have an adverse effect upon the earth's ozone layer. Replacements for these chlorofluorocarbons have therefore been sought.

At present, the most promising chlorofluorocarbon replacements appear to be the hydrohalocarbons. Because these hydrohalocarbons are less stable in the atmosphere than chlorofluorocarbons over an extended period of time, it is expected that the hydrohalocarbons will cause less damage to the ozone layer. However, these hydrohalocarbons have a greater tendency to degrade under foam-forming conditions than their chlorofluorocarbon predecessors. The hydrohalocarbons undergo dehydrohalogenation to form halogenated alkenes. They may also undergo reduction reactions in which halogen atoms are replaced with hydrogen.

One solution to the chlorofluorocarbon degradation problem which was suggested by Hammel et al in their paper entitled "Decomposition of HCFC-123, HCFC-123a, and HCFC-141b in Polyurethane Premix and in Foam," was to wait to add the HCFC to the foam-forming mixture until just before use. This solution is not, however, practical in commercial foam production processes.

Means for stabilizing hydrohalocarbons under foam forming conditions have, therefore, been sought by those in the art. U.S. Pat. No. 5,137,929, for example, teaches that inclusion of certain types of stabilizers in a foam-forming mixture reduces the amount of decomposition of a hydrohalocarbon blowing agent during the foaming process. Among the materials taught to be useful as stabilizers am esters, organic acids, anhydrides, aminoacids, ammonium salts, bromoalkanes, bromoalcohols, bromoaromatic esters, chloroalcohols, nitroalkanes, nitroalcohols, triarylmethyl chlorides, triarymethyl bromides, 3-sulfolene, zinc dialkyldithiophosphate, haloalkyl phosphate esters, carbon molecular sieves, powdered activated carbon, zeolite molecular sieves, sulfonate esters, and haloalkyl phosphate esters.

In their paper entitled "Minimization of HCFC-141b Decomposition in Rigid Polyisocyanurate Foams," Bodnar et al takes a different approach. Bodnar et al recommends that the catalyst employed in the foam-forming reaction be selected so that any compatibilizer in the polyol will not be able to solvate the cation of the catalyst and thereby render the anion of the catalyst more reactive.

SUMMARY OF THE INVENTION

It is an object of the present invention to provide a polyisocyanate which is useful in the production of rigid polyurethane, polyisocyanurate and polyurethane urea foams with HCFC blowing agents.

It is another object of the present invention to provide a polyisocyanate for the production of rigid polyurethane, polyisocyanurate and polyurethane urea foams with HCFC polyisocyanurate and polyurethane urea foams with HCFC blowing agents which does not cause significant dehydrohalogenation of the HCFC blowing agent.

It is also an object of the present invention to provide a composition for the production of polyurethane, polyisocyanurate and polyurethane urea foams with HCFC blowing agents.

It is another object of the present invention to provide a composition for the production of polyurethane, polyisocyanurate and polyurethane urea foams with HCFC blowing agents in which the HCFC blowing agent does not undergo dehydrohalogenation to any significant extent.

It is a further object of the present invention to provide a process for the production of polyurethane, polyisocyanurate and polyurethane urea foams in which an HCFC blowing agent is employed.

It is also an object of the present invention to provide polyurethane, polyisocyanurate and polyurethane urea foams having good physical properties which have been produced with an HCFC blowing agent.

These and other objects which will be apparent to those skilled in the art are accomplished by including a polyisocyanate having an acidity value of at least 0.01% HCl in a foam forming mixture. This polyisocyanate may be included in any of the known formulations capable of producing a rigid polyurethane, polyisocyanurete or polyurethane urea foam. In a preferred embodiment of the invention, a flame retardant and/or a chelating agent may be included in the reaction mixture.

DETAILED DESCRIPTION OF THE PRESENT INVENTION

The present invention relates to a polyisocyanate having an acidity value of at least 0.01% HCl and to the use of this polyisocyanate in formulations for the production of rigid polyurethane, polyisocyanurate and polyurethane urea foams with an HCFC blowing agent. The invention also relates to foaming processes in which these formulations are used and to the foams produced from these formulations.

Any of the known hydrohalocarbon or HCFC (i.e., hydrogen-containing chlorofluorocarbon) blowing agents which have a carbon-hydrogen bond next to a carbon-halogen bond may be used in the practice of the present invention. Specific HCFC blowing agents useful in the present invention include: 1-chloro-1,1-difluoroethane [HCFC-142b], 1 -chloro-1 -fluoro-2,2,2-trifluoroethane [HCFC-124], 1,1,1-trifluoro-2,2-dichloroethane [HCFC-123], 1,1-dichloro-1-fluoroethane [HCFC-141b] and combinations thereof. HCFC-141b is particularly preferred.

It is possible to include water or any of the known chlorofluorocarbon blowing agents with the HCFC blowing agents employed in the practice of the present invention. If water is used, it is preferably used in an amount of from about 0.25 to about 1.5 parts by weight per 100 parts of isocyanate reactive material (e.g., polyol). Use of chlorofluorocarbon blowing agents is not preferred.

Any of the known organic polyisocyanates (as used herein, the term "polyisocyanate(s)" includes "diisocyanate(s)") having an acidity value of at least 0.01% HCl may be used in the practice of the present invention. If no chelating agent or flame retardant is included in the foam-forming mixture, it is preferable that the polyisocyanate have an acidity value of from about 0.01 to about 0.07% HCl with acidity values of from about 0.01 to about 0.04% HCl being most preferable. If a chelating agent is included in the foam-forming mixture, a polyisocyanate with an acidity value of from about 0.01 to about 0.035% HCl is preferred. If a flame retardant is included in the foam-forming mixture, a polyisocyanate with an acidity value of from about 0.01 to about 0.035% HCl is preferred. If both a chelating agent and a flame retardant are included in the foam-forming mixture, a polyisocyanate with an acidity value of from about 0.01 to about 0.035% HCl is preferred. These polyisocyanates may be aromatic, aliphatic, cycloaliphatic or combinations thereof.

Specific examples of suitable polyisocyanates include: m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, 3,3'-dimethyldiphenylpropane-4,4'-diisocyanate, 2,4,6-toluene triisocyanate, 4,4'-dimethyldiphenyl-methane-2,2',5,5'-tetraisocyanate and the polymethylene polyphenyl polyisocyanates.

A crude polyisocyanate having the required acidity value may also be used. The crude toluene diisocyanate obtained by phosgenating a mixture of toluene diamines and the crude diphenylmethane diisocyanate obtained by phosgenating crude diphenylmethane diamine are examples of suitable crude polyisocyanates.

Preferred polyisocyanates are methylene-bridged polyphenyl polyisocyanates and prepolymers of methylene-bridged polyphenyl polyisocyanates having the required acidity value, an average functionality of from about 1.8 to about 3.5, preferably from about 2.0 to about 3.1 isocyanate moieties per molecule and an NCO content of from about 28 to about 34% by weight.

Any of the known polyisocyanates may, of course, be modified to satisfy the acidity requirement of the present invention by adding an acid or a material which acts as an acid in the presence of an isocyanate to the isocyanate in an amount sufficient to cause that isocyanate to have the desired acidity value. Specific examples of suitable acids include: hydrochloric acid, benzoyl chloride, sulfuric acid, dialkyl hydrogen phosphates (such as di(2-ethylhexyl) phosphate), and phosphoric acid.

Acidity value, as used herein for isocyanates, means the total acidity content measured by KOH titration and expressed as % HCl as described in ASTM methods D 1638 or D 4876-88. This value may be determined by dissolving the polyisocyanate in a solvent and titrating the resultant solution with potassium hydroxide to the neutralization point.

In preferred embodiments of the present invention, a chelating and/or flame retarding agent is also included in the foam-forming mixture.

Any of the known chelating agents which is acidic may, in principle, be used in the practice of the present invention. Chelating agents with pKa values of from 0 to 10 are preferred. Chelating agents which form 5- or 6-membered ring chelates with a metal cation are particularly preferred. Specific examples of suitable chelating agents include, but are not limited to: tartaric acid, 2,4-pentanedione, maleic acid, tris(nonylphenyl) phosphite, oxalic acid, ethylene diamine tetraacetic acid and its salt, sodium tripolyphosphate, hexametaphosphoric acid, nitrilotriacetic acid, trifluoroacetylacetone, citric acid, gluconic acid, salicyclic acid and phthalic acid. Tartaric acid, 2,4-pentanedione, and maleic acid are particularly preferred.

Any of the known flame retarding agents having an acid number greater than 0 mg KOH/gram of sample may, in principle, be used in the practice of the present invention. A flame retardant having an acid number greater than 0.25 mg KOH/gram of sample is preferably used in the practice of the present invention. Flame retardants having an acid number of from about 0.25 to about 5.0 are particularly preferred. Higher molecular weight (i.e., molecular weight is greater than 400) flame retardants, particularly, haloalkyl phosphate ester flame retardants are preferred. Specific examples of suitable flame retardants include: tris(p-chloroethyl) phosphate, tris(p-chloroisopropyl)phosphate, tetrakis(2-chloroethyl)-2,2-bis(chloromethyl) propylenephosphate, dibromoneopentyl glycol, tribromoneopentyl alcohol, 2,3-dibromopropanol, tris(dichloropropyl)phosphate, tetrabromopthalate diol, and pentabromodiphenyl oxide. Tetrakis(2-chloroethyl)-2,2-bis(chloromethyl) propylene phosphate and tetrabromophthalate diol are preferred flame retardants.

In principle, any compound containing at least two Zerewitinoff active hydrogen atoms and having a molecular weight of from about 32 to about 12,000, preferably from about 60 to about 10,000 may be included in the foam-forming mixtures of the present invention. Such compounds may contain amino groups, thiol groups, carboxyl groups and/or hydroxyl groups. Compounds containing hydroxyl groups having a molecular weight of from about 60 to about 8000, most preferably from about 300 to about 6000 are preferred. Compounds containing amino groups having a molecular weight of from about 300 to about 4000 are also preferred. Polyols which have little or no residual pH-basic materials present therein are particularly preferred.

Preferred compounds containing hydroxyl groups include: polyesters, polyethers, polythioethers, polyacetals, polycarbonates, and polyester amides containing at least 2, generally from 2 to 8, but preferably from 2 to 6 hydroxyl groups. Polyethers containing at least 2, generally from 2 to 8, most preferably 2 to 6 hydroxyl groups are particularly preferred.

It has been found to be particularly advantageous to use sucrose-based polyether polyols having an average molecular weight of from about 400 to about 1200 which have been produced by reacting sucrose, and optionally other initiators with propylene oxide and/or ethylene oxide in the presence of an alkaline catalyst and treated to neutralize and/or remove the catalyst. Amine-based polyether polyols such as those prepared by reacting aromatic or aliphatic amines with propylene and/or ethylene oxide are also preferred.

Relatively low molecular weight (i.e., a molecular weight of from about 32 to 400) isocyanate reactive materials may also be included in the foam-forming reaction mixtures of the present invention. These low molecular weight isocyanate reactive materials may contain hydroxyl groups and/or amino groups and/or thiol groups and/or carboxyl groups. Compounds containing hydroxyl and/or amino groups are preferred. These compounds which generally contain from 2 to 8 and preferably from 2 to 4 isocyanate-reactive hydrogen atoms serve as chain extenders or crosslinkers. Specific examples of such compounds include: glycols such as ethylene glycol, 1,2- and 1,3-propylene glycol, diethylene glycol, triethylene glycol, trimethylene glycol, 1,3-butylene glycol, tetramethylene glycol; diols such as 1,6-hexanediol, 1,5-pentanediol, 1,3-propanediol, 1,10-decandiol, glycerol, hexanetriol, trimethylol propane, pentaerthritol, 1,2,6-hexanetriol, sorbitol and diamines such as diethyl toluene diamine.

Any of the catalysts known to be useful in the production of rigid polyurethane, polyisocyanurate or polyurethane urea foams may be used in the practice of the present invention. Tertiary amines are particularly useful. Specific examples of catalysts which are useful in the practice of the present invention include: triethylene diamine; the glycolic acid salt of triethylene diamine; the proprietary amine catalyst available under the name Dabco 85 from Air Products and Chemicals, Inc.; acid blocked triethylene diamine; pentamethyl diethylene triamine; N,N-dimethylcyclohexylamine; N,N',N"-tris-(N,N-dimethyl-3-aminopropyl)-S-hexahydrotriazine; N,N,N-trim ethyl-N-hydroxyethyl-bisaminoethylether; N,N-bis-(3-dimethylaminopropyl)-N-isopropylamine; triethylamine; tributylamine; N,N,N',N'-tetramethylene diamine; 1,4-diazabicyclo-(2,2,2)-octane; N-methyl-N'-dimethylaminoethyl-piperazine; N,N-dimethylbenzylamine; and monocyclic and bicyclic amidines. Organometallic catalysts such as dibutyltin dilaurate, dibutyl tin oxide, dibutyltin dichloride, dibutyl tin diacetate, dibutyl tin maleate, dioctyl tin diacetate, tin(II) acetate, tin(II)octoate, and tin(II)ethylhexoate may also be used.

In the practice of the present invention, the isocyanate and isocyanate reactive materials are generally used in amounts such that the equivalent ratio of isocyanate to isocyanate reactive groups is from about 1.0 to about 3, (i.e., an isocyanate index of from about 100 to about 300) preferably from about 1.0 to about 2.5. The HCFC blowing agent is generally included with the isocyanate-reactive compound in an amount of from about 10 to about 60 parts by weight, preferably from about 10 to about 40 parts by weight per 100 parts of polyol.

The chelating agent, if included, is generally used in an amount of from about 0.1 to about 3 parts by weight, preferably from about 0.15 to about 2 parts by weight based on 100 parts by weight of polyol. The flame retardant, if included, is generally used in an amount of from about 0.5 to about 10 parts by weight, preferably from about 2 to about 5 parts by weight based on 100 parts by weight of polyol.

When a catalyst is included in the foam-forming mixture, it is preferably used in an amount of from about 0.25 to about 8 parts by weight, based on 100 parts by weight polyol, most preferably from about 0.25 to about 3.0 parts by weight.

Foams may be produced from the foam-forming mixtures of the present invention using any of the known techniques. It is preferred that all of the isocyanate reactive compound (s), catalyst, blowing agent, any acidic chelating agent and any flame retardant be combined before adding the polyisocyanate having an acidity of at least 0.01% HCl.

Having thus described our invention, the following examples are given as being illustrative thereof. All parts and percentages given in these examples are parts by weight and percentages by weight, unless otherwise indicated.

EXAMPLES

The following materials were used in the Examples given below:

POLYISOCYANATE A: A polyether polyol modified toluene diisocyanate prepolymer having a 34% NCO content which is commercially available under the name Mondur E-437 from Miles Inc. This polyisocyanate had an acidity of 0.0069% HCl.

POLYISOCYANATE B: A polyether polyol modified toluene diisocyanate prepolymer having a 34% NCO content which is commercially available under the name Mondur E-437 from Miles Inc. This polyisocyanate had an acidity of 0.0344% HCl.

POLYISOCYANATE C: A polyether polyether modified toluene diisocyanate prepolymer having a 34% NCO content which is commercially available under the name Mondur E-437 from Miles Inc. This polyisocyanate had an acidity of 0.0295% HCl.

POLYISOCYANATE D: A polyether polyol modified toluene diisocyanate prepolymer having a 34% NCO content which is commercially available under the name Mondur E-437 from Miles Inc. This polyisocyanate had an acidity of 0.0316% HCl.

POLYISOCYANATE E: A polymeric MDI prepolymer having a 29.5% NCO content which is commercially available under the name Mondur E-577 from Miles Inc. This polyisocyanate had an acidity of 0.0274% HCl.

POLYISOCYANATE F: a polymeric isocyanate having a 32% NCO content which is commercially available under the name Mondur MR from Miles Inc. This polyisocyanate had an acidity of 0.031% HCl.

POLYISOCYANATE G: A polymethylene polyphenyl polyisocyanate with an NCO content of 32% which is commercially available from Miles Inc. under the name Mondur MR-L. This polyisocyanate had an acidity of 0.013% HCl.

POLYISOCYANATE H: a polymethylene polyphenyl polyisocyanate with an NCO content of 32% which is commercially available from Miles Inc. under the name Mondur MR-L. This polyisocyanate had an acidity of 0.020% HCl.

POLYOL A: A tetrafunctional polyether polyol prepared by reacting toluene diamine with ethylene oxide and then propylene oxide in the presence of a base catalyst and subsequently neutralizing the reaction mixture with sulfuric acid and removing the salts formed by filtration. This polyol has an OH number of 460 and is commercially available from Miles Inc. under the name Multranol 4063.

HCFC-141b: 1,1-dichloro-1-fluoroethane.

CATALYST A: pentamethyldiethylenetriamine (commercially available under the name Polycat 5)

CATALYST B: N,N-dimethylcyclohexylamine (commercially available under the name Polycat 8)

CATALYST C: N,N',N"-tris(N,N-dimethyl-3-aminopropyl)-S-hexahydrotriazine (commercially available under the name Polycat 41)

CATALYST D: 38% potassium acetate in glycol (commercially available under the name Polycat 46)

CATALYST E: tertiary amine which is commercially available under the name Dabco 85

CATALYST F: delayed action, acid blocked triethylenediamine which is commercially available under the name Dabco 8154

CATALYST G: 33% triethylenediamine in glycol which is commercially available under the name Dabco EG CATALYST H: the glycolic acid salt of triethylenediamine and 1,1-dibutyltin diacetate which is commercially available under the name Dabco DC-2.

CATALYST I: N,N,N-trimethyl-N-hydroxyethylbisaminoethyl ether (commercially available under the name Texacat ZF-10)

CATALYST J: N, N-bis(3-dimethylaminopropyl)-N-isopropylamine (commercially available under the name Texacat ZF-50)

CHELATING AGENT A: tartaric acid

CHELATING AGENT B: 2,4-pentanedione

CHELATING AGENT C: maleic acid
CHELATING AGENT D: tris(nonylphenol) phosphite
SURFACTANT: the siloxane polyalkylene copolymer which is commercially available under the name L-6900 from OSI Specialties, Inc.
FLAME RETARDANT A: tris(p-chloroethyl) phosphate (commercially available under the name Fryol CEF)
FLAME RETARDANT B: tris(p-chloroisopropyl) phosphate (commercially available under the name Fryol PCF)
FLAME RETARDANT C: tetrakis(2-chloroethyl)-2,2-bis (chloromethyl) propylene phosphate (commercially available under the name Antiblaze 100)

Example 1

Various tertiary amine catalysts were evaluated in a rigid polyisocyanate foam formulation to determine their effect upon HCFC dehydrohalogenation.

100 parts of POLYOL A, 2 parts of SURFACTANT (L-6900), 25 parts HCFC-141b and 1.5 parts of water were combined to form the isocyanate-reactive component. POLYISOCYANATE A was then added with mixing to the polyisocyanate reactive mixture in an amount such that the equivalent ratio of isocyanate groups to isocyanate reactive groups was 1.05. The specific catalyst employed to make each foam, the amount of that catalyst used and the amount of dehydrohalogenation product measured in the product foam are reported in Table 1.

TABLE 1

| CATALYST | PBW CATALYST | µg of HCFC-1131a/g of HCFC-141b* |
|---|---|---|
| A | 1.6 | 5050 |
| B | 3.0 | 1300 |
| C | 2.5 | 1700 |
| D | 2.5 | 33,500 |
| E | 3.0 | 500 |
| F | 3.0 | 1280 |
| G | 3.0 | 1000 |
| H | 2.0 | 1240 |
| I | 1.6 | 2940 |
| J | 1.6 | 2360 |

*Determined by gas chromatography

Example 2

The effect of the acidity of the polyisocyanate used to produce a rigid polyurethane foam was studied. In this study, 100 parts by weight of POLYOL A, 2 parts by weight of a silicone surfactant (L-6900), 3 parts by weight of CATALYST B, 25 parts by weight of HCFC-141 b and 1.5 parts by weight of water were combined to form the isocyanate reactive component. Polyisocyanates having different acidity values were then reacted with this isocyanate reactive component in an amount of 128 parts by weight (the equivalent ratio of isocyanate to isocyanate reactive groups was 1.05). The specific polyisocyanate, the density of the product foam and the amount of dehydrohalogenation product found in the product foam are reported in Table 2.

TABLE 2

| SAMPLE | 2A | 2B | 2C |
|---|---|---|---|
| POLYISOCYANATE USED | A | B | C |
| DENSITY (pounds/cubic foot) | 1.5 | 1.5 | 1.5 |
| µg HCFC-1131a/g HCFC-141b* | 1300 | 567 | 487 |

*Determined by gas chromatography

Example 3

The effect of the acidity of a polyisocyanate upon the dehydrohalogenation of HCFC-141b was studied by combining 100 parts by weight of POLYOL A, 2 parts by weight of SURFACTANT (L-6900), either 3 or 6 parts by weight of CATALYST B, 1.5 parts by weight of water, and either 25 or 27 parts by weight of HCFC-141b to form an isocyanate reactive component. Either 128 or 147.5 parts by weight of a polyisocyanate were then reacted with this isocyanate reactive component. The amount of catalyst, the amount of HCFC-141b, the specific isocyanate and the amount of that polyisocyanate used, the density of the product foam and the amount of dehydrohalogenation product present in the product foam are reported in Table 3.

TABLE 3

| SAMPLE | 3A | 3B | 3C |
|---|---|---|---|
| Amount of CATALYST B | 3 pbw | 3 pbw | 6 pbw |
| Amount of HCFC-141b | 25 pbw | 25 pbw | 27 pbw |
| POLYISOCYANATE | A | D | E |
|  | 128 pbw | 128 pbw | 147.5 pbw |
| Density (pounds/cubic foot) | 1.5 | 1.5 | 1.5 |
| µg HCFC-131a/g HCFC-141b* | 1100 | 520 | 580 |

*Determined by gas chromatography

Example 4

100 parts by weight of POLYOL A, 2 parts by weight of SURFACTANT (L-6900), 28 parts by weight of HCFC-141b, 1.5 parts by weight of water, and 5 parts by weight of CATALYST B were combined to form an isocyanate reactive component. 136 parts by weight of a polyisocyanate was then reacted with this isocyanate reactive component. The specific polyisocyanate, the density of the product foam and the amount of dehydrohalogenation product present in the product foam are reported in Table 4.

TABLE 4

| SAMPLE | 4A | 4B | 4C |
|---|---|---|---|
| POLYISOCYANATE | F | G | H |
| Density (lbs/ft$^2$) | 1.4 | 1.4 | 1.4 |
| µg HCFC-131a/g HCFC-141b* | 410 | 210 | 110 |

*Determined by gas chromatography

Example 5

100 parts by weight of POLYOL A, 2 parts by weight of SURFACTANT (L-6900), 25 parts by weight of HCFC-141b, 1.5 parts by weight of water, 3 parts by weight of CATALYST B, and one of several chelating agents were combined to form an isocyanate reactive component. 128 parts by weight of POLYISOCYANATE A were then reacted with this isocyanate reactive component at an isocyanate index of 105. Each of the foams had a density of from 1.5 to 1.6 lbs/ft$^3$. The chelating agent used, the amount of that chelating agent used, and the amount of dehydrohalogenation product present in the product foam are reported in Table 5.

TABLE 5

| SAMPLE | 5A | 5B | 5C | 5D | 5E | 5F | 5G | 5H |
|---|---|---|---|---|---|---|---|---|
| CHELATING AGENT | — | A | A | B | B | C | C | D |
| PBW CHELATING AGENT | — | 0.15 | 0.3 | 0.25 | 0.5 | 0.15 | 0.3 | 2 |
| μg HCFC-1131a/g HCFC-141b* | 1300 | 430 | 280 | 500 | 320 | 740 | 880 | 670 |

*Determined by gas chromatography

Example 6

100 parts by weight of POLYOL A, 2 parts by weight of SURFACTANT (L-6900), 25 parts by weight of HCFC-141b, 1.5 parts by weight of water, 3 parts by weight of CATALYST B, and 5 parts by weight of a flame retardant were combined to form an isocyanate reactive component. 128 parts by weight of POLYISOCYANATE A were then reacted with this isocyanate reactive component at an isocyanate index of 105. The specific flame retardant used, the density of the product foam and the amount of dehydrohalogenation product found in the product foam are reported in Table 6.

TABLE 6

| SAMPLE | 6A | 6B | 6C | 6D |
|---|---|---|---|---|
| FLAME RETARDANT | — | A | B | C |
| Density (lbs/ft³) | 1.5 | 1.5 | 1.5 | 1.5 |
| μg HCFC-1131a/g HCFC-141b* | 1300 | 90 | 570 | <25 |

*Determined by gas chromatography

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid polyurethane, polyisocyanurate, or polyurethane urea foam forming mixture comprising:
   a) a polyisocyanate having an acidity value of at least 0.01% HCl,
   b) an isocyanate reactive material having a molecular weight of from about 400 to about 12,000 selected from the group consisting of polyethers, polythioethers, polyacetals, polycarbonates and polyester amides, and
   c) a hydrohalocarbon blowing agent.

2. The foam-forming mixture of claim 1 in which component b) is a sucrose-based polyether polyol having a molecular weight of from about 400 to about 1200.

3. The foam-forming mixture of claim 1 in which the hydrohalocarbon blowing agent is selected from the group consisting of 1-chloro-1,1-difluoroethane, 1-chloro-1-fluoro-2,2,2-trifluoroethane, 1,1,1-trifluoro-2,2-dichloroethane, 1,1-dichloro-1-fluoroethane and mixtures thereof.

4. The foam-forming mixture of claim 3 in which a flame retardant having an acid number greater than 0.25 mg KOH per gram of flame retardant is included.

5. The foam-forming mixture of claim 4 in which an acidic chelating agent is included.

6. The foam-forming mixture of claim 1 in which the hydrohalocarbon blowing agent is 1,1-dichloro-1-fluoroethane.

7. The foam-forming mixture of claim 6 in which a flame retardant having an acid number greater than 0.25 mg KOH per gram of flame retardant is included.

8. The foam-forming mixture of claim 7 in which an acidic chelating agent is included.

9. The foam-forming mixture of claim 1 in which a flame retardant having an acid number greater than 0.25 mg KOH per gram of flame retardant is included.

10. The foam-forming mixture of claim 9 in which an acidic chelating agent is included.

11. The foam-forming mixture of claim 1 in which an acidic chelating agent is included.

12. The foam-forming mixture of claim 1 in which at least one chlorofluorocarbon is present in addition to hydrohalocarbon blowing agent c).

13. The foam-forming mixture of claim 12 in which the hydrohalocarbon blowing agent constitutes at least 5% by weight of the total blowing agent present.

14. The foam-forming mixture of claim 5 in which the acidic chelating agent is a compound which forms 5- or 6-membered ring chelates with a metal cation.

15. The foam-forming mixture of claim 1 in which the isocyanate-reactive material b) is a polyol.

16. The foam-forming mixture of claim 15 in which any residual basic catalyst present in the polyol has been removed or neutralized prior to inclusion in the foam-forming mixture.

17. The foam-forming mixture of claim 15 in which an acid chelating agent is included in an amount sufficient to chelate any potassium residue present in the polyol.

18. The foam-forming mixture of claim 11 in which the chelating agent is maleic acid, tartaric acid or 2,4-pentanedione.

19. The foam-forming mixture of claim 9 in which the flame retardant is tetrakis-(2-chloroethyl)-2,2-bis(chloromethyl)propylene phosphate.

20. A process for the production of rigid polyurethane, polyisocyanurate and polyurethane urea foams comprising reacting a) a polyisocyanate having an acidity of at least 0.01% HCl, with b) an isocyanate-reactive material having a molecular weight of from about 400 to about 12,000 selected from the group consisting of polyethers, polythioethers, polyacetals, polycarbonates, and polyester amides, in the presence of c) a hydrohalocarbon blowing agent at an isocyanate index of from about 100 to about 300.

21. The process of claim 20 in which a flame retardant having an acid number greater than 0.25 mg KOH per gram of flame retardant is included.

22. The process of claim 21 in which an acidic chelating agent is included.

23. The process of claim 20 in which an acidic chelating agent is included.

24. The process of claim 20 in which the hydrohalocarbon blowing agent is selected from the group consisting of 1-chloro-1,1-difluoroethane, 1-chloro-1-fluoro-2,2,2-trifluoroethane, 1,1,1-trifluoro-2,2-dichloroethane, 1,1-dichloro-1-fluoroethane and mixtures thereof.

25. The process of claim 20 in which the hydrohalocarbon blowing agent is 1,1-dichloro-1-fluoroethane.

26. The process of claim 20 in which water is included.

27. The product of the process of claim 20.

28. The product of the process of claim 22.

29. The product of the process of claim 25.

* * * * *